United States Patent
Veysset

(10) Patent No.: US 11,691,221 B2
(45) Date of Patent: Jul. 4, 2023

(54) MATERIAL JOINING USING JET LOCKING

(71) Applicant: Massachusetts Institute of Technology, Cambridge, MA (US)

(72) Inventor: David Veysset, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 111 days.

(21) Appl. No.: 17/004,296

(22) Filed: Aug. 27, 2020

(65) Prior Publication Data

US 2021/0086300 A1  Mar. 25, 2021
US 2021/0387285 A9  Dec. 16, 2021

Related U.S. Application Data

(60) Provisional application No. 62/988,264, filed on Mar. 11, 2020, provisional application No. 62/903,225, filed on Sep. 20, 2019.

(51) Int. Cl.
| | | |
|---|---|---|
| B23K 26/211 | (2014.01) | |
| B23K 26/57 | (2014.01) | |
| B23K 26/356 | (2014.01) | |
| B23K 103/18 | (2006.01) | |

(52) U.S. Cl.
CPC .......... B23K 26/211 (2015.10); B23K 26/356 (2015.10); B23K 26/57 (2015.10); *B23K 2103/18* (2018.08)

(58) Field of Classification Search
CPC .... B23K 26/211; B23K 26/356; B23K 26/57; B23K 2103/18

USPC .............. 219/128, 121.64, 121.6, 121.85
See application file for complete search history.

(56) References Cited

U.S. PATENT DOCUMENTS

| | | | |
|---|---|---|---|
| 6,173,886 B1* | 1/2001 | McCay | B23K 35/3601 219/76.1 |
| 2013/0064993 A1* | 3/2013 | Rubenchik | H05K 3/14 118/623 |
| 2013/0180969 A1* | 7/2013 | Cheng | B23K 26/356 219/121.85 |
| 2015/0143916 A1* | 5/2015 | Toller | G01N 21/15 73/827 |
| 2016/0237521 A1* | 8/2016 | Zhang | C21D 7/06 |
| 2020/0346301 A1* | 11/2020 | Yao | B23K 26/0604 |

OTHER PUBLICATIONS

Invitation to Pay Additional Fees for PCT/US2020/048091 dated Oct. 5, 2020.

* cited by examiner

*Primary Examiner* — Tu B Hoang
*Assistant Examiner* — Alba T Rosario-Aponte
(74) *Attorney, Agent, or Firm* — Wolf, Greenfield & Sacks, P.C.

(57) ABSTRACT

Joining methods and corresponding structures are disclosed. In some instances, a method for joining two or more components may include generating a shockwave in a first component to form a jet of a material of the first component directed towards a second component. The jet may penetrate the second component to connect the first component with the second component. Articles of pre-joined and joined components are also described.

24 Claims, 5 Drawing Sheets

MATERIAL JOINING USING JET LOCKING

RELATED APPLICATIONS

This application claims priority under 35 U.S.C. § 119(e) to U.S. Provisional Application No. 62/988,264, filed Mar. 11, 2020, and U.S. Provisional Application No. 62/903,225, filed Sep. 20, 2019, which are incorporated herein by reference in their entirety for all purposes.

TECHNICAL FIELD

Articles and methods for material joining using jet locking are generally described.

BACKGROUND

With the development of multi-functional devices along with their miniaturization, composite and multi-materials structures have become particularly attractive to industry because of the enhanced performance they can offer (e.g., light weight, corrosion and impact resistance) and the increased flexibility in design and production. Indeed, combining a metal with a polymer, for instance, benefits from the strength, electrical, and thermal conductivity of the metal and the chemical properties and lighter weight of the polymer.

However, joining different materials poses a challenge because of the large differences in physical and chemical properties of the materials. Further, conventional methods that were developed for large scale, structural applications show limitations at smaller size scales.

SUMMARY

Articles and methods for material joining using jet locking are generally described. The subject matter of the present disclosure involves, in some cases, interrelated products, alternative solutions to a particular problem, and/or a plurality of different uses of one or more systems and/or articles.

In one aspect, a joining method may include generating a shockwave in a first component to form a jet of a material of the first component directed towards a second component and penetrating the second component with the jet to connect the first component with the second component.

In another aspect, an article may include: a first component; a confinement layer adjacent to a first surface of the first component; an ablation layer disposed between the confinement layer and the first component; and a second component disposed adjacent to a second surface of the first component opposite the first surface. The first component includes at least one notch located on the second surface and oriented towards the second component.

In yet another aspect, an article may include a first component and a second component adjacent to a surface of the first component. At least one jet of a material of the first component extends from the first component into the second component, and the at least one jet connects the first component to the second component.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment shown where illustration is unnecessary to allow those of ordinary skill in the art to understand. In the figures.

DETAILED DESCRIPTION

Figure 1A:
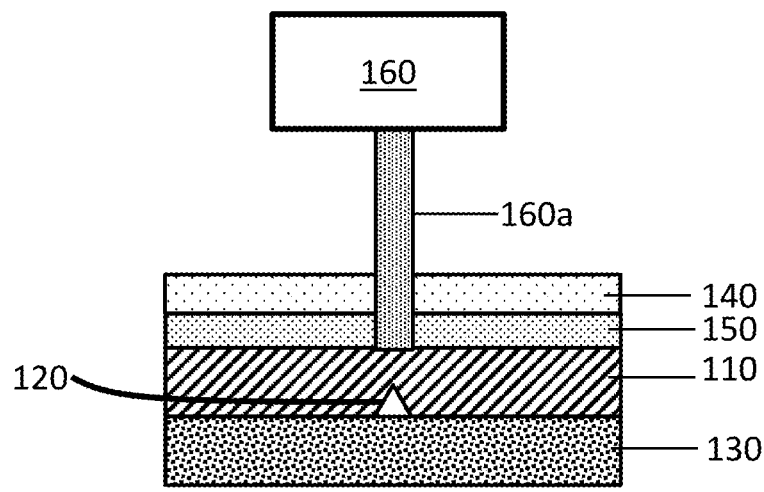
FIGS. 1A-1B schematically illustrate material joining via the micro-jet locking concept where, following laser ablation and shock propagation in the foil, a jet forms at the tip of the notch and penetrates at high velocity the other component, locking the other component to the metal, according to some embodiments.

The inventors have recognized that most laser-based techniques for joining dissimilar materials, such as metals and polymers rely, on thermal heating of one or both materials, which can affect the microstructure of the materials (e.g., metal and/or polymer), and hence the mechanical properties of these materials, before joining. Accordingly, the Inventors have recognized a need for different joining methods capable of joining dissimilar materials to one another.

In view of the above, the Inventors have recognized the benefits associated with forming one or more jets of material that extend from a first component into a second component to join the components together. While this may be accomplished in a number of ways, in one embodiment, a shockwave may be generated in the first component to form a jet of material directed outwards from the first component towards the second component. The jet may penetrate into the second component to form a connection there between to connect the first component and the second component. In some embodiments, the one or more jets may be formed by exciting (e.g., flash heating) an ablation layer disposed between a confinement layer and the first component to form a plasma that generates a shockwave in the first component. The shockwave may propagate through the first component to a notch, or other feature, that causes the shockwave to form the jet extending outwards from a surface of the first component opposite the ablation layer. As the jet moves outwards away from the first component, the jet may then penetrate into the second component to form the desired connection there between.

As mentioned above, in some embodiments, a shockwave may be generated in a first component to form a jet of material of the first component directed towards a second component through use of an ablation layer and associated confinement layer. Specifically, the shockwave is generated by an ablation layer adjacent to the first component, which is excited by a light source (e.g., a laser) such that a plasma is created in the ablation layer. A confinement layer located adjacent to the ablation layer and on an opposing side and/or surface of the ablation layer relative to the first component may cause the plasma to propagate toward the first component creating a shockwave that forms a jet in the first component directed towards the second component. The jet may then penetrate into the second component as described above thereby joining the first component and the second component.

The shockwave may propagate move through a medium (e.g., air), move through the first component, the ablation layer, and/or confinement layer) having a particular velocity. In some embodiments, the shockwave propagates with a velocity of greater than or equal to 100 m/s, greater than or equal to 200 m/s, greater than or equal to 300 m/s, greater than or equal to 400 m/s, greater than or equal to 500 m/s, greater than or equal to 600 m/s, greater than or equal to 700 m/s, greater than or equal to 800 m/s, greater than or equal to 900 m/s, or greater than or equal to 1,000 m/s. In some embodiments, the shockwave propagates with a velocity of less than or equal to 1,000 m/s, less than or equal to 900 M/s, less than or equal to 800 m/s, less than or equal to 700 m/s, less than or equal to 600 m/s, less than or equal to 500 m/s, less than or equal to 400 m/s, less than or equal to 300 m/s, less than or equal to 200 m/s, or less than or equal to 100 m/s. Combinations of the above-referenced ranges are also possible (e.g., greater than or equal to 200 m/s and less than or equal to 400 m/s). The shockwave having a particular velocity within the ranges disclosed above may advantageously help create a jet of the first component (e.g., a jet of the material of the first component) that penetrates and joins the first component to the second component, while avoiding undesirably damaging of the first component and/or the second component.

A first component used for forming a jet in the methods or articles disclosed herein may be made from any appropriate material capable of plastically deforming to any extent to form a jet and subsequent connection with a separate second component. The first component and the second component may be of the same or different material. Appropriate materials for the first component may include metals a metal foil, aluminum), polymers (e.g., polyurea), composites of these materials, and/or any other appropriate material capable of plastically deforming to form the described jets to connect the first component to the second component. Correspondingly, the second component may be made from any appropriate material that the jets of the first component are capable of connecting to either through mechanical locking, penetration, and/or direct bonding. Appropriate materials for the second component may include, but are not limited to, metals (e.g., a metal foil, aluminum), ceramics, polymers (e.g., polyurea), gels, composites of these materials, and/or any other appropriate material capable of forming a connection with the one or more jets of the first component.

A material a material of the first component and/or the second component) can have any suitable thickness for joining or connecting the first component and the second component together using a jet of material from the first component. In some embodiments, the thickness of a material is less than or equal to 500 microns, less than or equal to 250 microns, less than or equal to 100 microns, less than or equal to 80 microns, less than or equal to 60 microns, less than or equal to 50 microns, less than or equal to 40 microns, less than or equal to 30 microns, less than or equal to 20 microns, or less than or equal to 10 microns. Correspondingly, in some embodiments, the thickness of a material is greater than or equal to 10 microns, greater than or equal to 20 microns, greater than or equal to 30 microns, greater than or equal to 40 microns, greater than or equal to 50 microns, greater than or equal to 60 microns, greater than or equal to 80 microns, greater than or equal to 100 microns, greater than or equal to 250 microns, or greater than or equal to 500 microns. Combinations of the above-referenced ranges are also possible (e.g., greater than or equal to 10 microns and less than or equal to 100 microns). Providing a thickness of a material within the above-described ranges can permit joining of materials on the micron or sub-micron scale. However, it should be understood that other ranges are possible as this disclosure is not so limited.

Without wishing to be bound by theory, depending on the particular material selected for a first and second component, different types of connections may be formed between the first and second components. For example, in instances where the first component includes a viscoelastic solid such as a polymer or gel, a sufficiently compliant metal or a ceramic may be used for the second component. In such an instance, the metal or ceramic would be capable of being penetrated by a jet of the first component (e.g., the viscoelastic solid) and the jet of a material of the first component may penetrate into the second component to lock the two components together. Alternatively or additionally, if pores, such as micropores, are already present in a surface of the second component, the jet of the first component may penetrate into at least one of the pores of the second component to lock the first and second components together. In yet another embodiment, a jet of material from a first component may not penetrate the surface of a second component. Instead, the jet may impact the surface of the second component and remove an oxide or other barrier layer, if present, included in and/or adjacent to the second component and promote direct bonding due to the close contact between the material of the jet of the first component and the material of the second component (e.g., a pristine surface of the second component protected by the oxide or other barrier layer). For example, in such an embodiment where the first component and the second component include two metals, a metallic jet of the first component may remove a metal oxide located on a surface of the second component to promote joining or connection (e.g., metallic bonding) between the first and second components.

As noted above, a light source may excite an ablation layer and may heat the ablation layer to form a plasma by absorbing energy from a light source. In some embodiments, the light source comprises a laser. However, other light sources may be used. In certain embodiments, the laser is Nd:YAG (neodymium-doped yttrium aluminum garnet; $Nd:Y_3Al_5O_{12}$) laser, which may be capable of nanosecond duration pulses. In some embodiments, the laser may generate a plasma in the ablation layer, or the first component, and this plasma may generate the shockwave that forms the jet. As understood by those skilled in the art, formation of a plasma is distinct from simply melting a solid, and it will be appreciated within the teachings of the present disclosure that formation of a plasma may advantageously provide the jet with sufficient energy to join the first component with the second component within melting or substantially damaging either component. Without wishing to be bound by theory, in some embodiments during jet formation, a strength of a material of the first component may be surpassed by the inertia brought by the shockwave while maintaining a solid structure (e.g., a solid jet) into the second component. Thus, in some embodiments, generating a shockwave does not liquefy the first component during deformation and formation of the jet. Accordingly, the jet of material that is formed may be a jet of solid material. However, it should be understood that, in other embodiments, the light source may excite the ablation layer as to at least partially melt (e.g., liquefy) the ablation layer and/or the first component as this disclosure is not so limited.

In some embodiments, the jet is of the micron scale or smaller. For example, in some embodiments, a maximum transverse cross-sectional dimension, such as a thickness or diameter of the jet (e.g., a micro-jet) is no greater than 500 microns, no greater than 400 microns, no greater than 300 microns, no greater than 200 microns, no greater than 100 microns, no greater than 50 microns, no greater than 10 microns, no greater than 1 micron, or any other appropriate size scale. Correspondingly, the maximum transverse cross-sectional dimension may be greater than or equal to 1 micron, 50 microns, 100 microns, 200 microns, 300 microns, or any other appropriate size scale. Combinations of the above ranges are contemplated including, for example, a maximum transverse cross-sectional dimension that is between or equal to 1 micron and 500 microns. Micron scale jets may advantageously provide micron precision in joining materials, such as those required in microelectronics. That is to say, certain existing methods of joining materials together were developed for macroscale (e.g., larger than a millimeter structural, applications, but may show limitations at the micron scale, and, as such, articles and methods described herein may overcome these limitations. Of course, it should be understood that the use of jets with size scales both greater and less than those noted above are also contemplated as the disclosure is not limited in this fashion.

The jet (e.g., the jet of the first component, the jet of the material of the first component) may penetrate the second component within a particular amount of time. For example, in some embodiments, the jet of the first component penetrates the second component within 1000 nanoseconds, within 900 nanoseconds, within 800 nanoseconds; within 700 nanoseconds, within 600 nanoseconds, within 0.500 nanoseconds, within 400 nanoseconds, within 300 nanoseconds, within 200 nanoseconds, within 100 nanoseconds, within 50 nanoseconds, or within 10 nanoseconds. Penetrating the second component within the above-referenced ranges may be used to form a jet and/or connect the first component and the second component relatively quickly compared to certain existing methods of joining two materials together. Advantageously, forming a jet relatively quickly can reduce the impulse of jet formation and/or joining, which can reduce damage to the materials of the first component and/or the second component. However, other ranges are possible as the disclosure is not limited in this fashion.

In some embodiments, the first component includes a notch prior to forming a jet penetrating the second material. The notch may assist in directing the formation of a jet towards the second component upon propagation of a shockwave from an ablation layer through the first component. Thus, the use of micro jetting from notches may be advantageously used to induce micro-jetting from notches to form a connection between a first component and a second component made from any appropriate material (e.g., metal and ceramic, metal and metal, metal and polymer, and/or any other appropriate material connection combinations). One advantage in this method is that, other than notch fabrication, additional surface cleaning and/or treatment of the first and/or second component may not be required.

In certain embodiments, a notch formed in a first component to be joined is of the micron size scale (e.g., 100 microns). For example, in some embodiments, a maximum transverse cross-sectional dimension of the notch, e.g. a width or height of the notch, is no greater than 500 microns, no greater than 400 microns, no greater than 300 microns, no greater than 200 microns, no greater than 100 microns, no greater than 50 microns, no greater than 10 microns, or no greater than 1 micron. Micron scale notches may result in micro scale jets, the latter described above and elsewhere herein. Correspondingly, the maximum transverse cross-sectional dimension of the notch may be greater than or equal to 1 micron, 50 microns, 100 microns, 200 microns, 300 microns, or any other appropriate size scale. Combinations of the above ranges are contemplated including, for example, a maximum transverse cross-sectional dimension of the notch that is between or equal to 1 micron and 500 microns.

While the particular ranges for notch sizes and resulting jet maximum transverse cross-sectional dimensions have been noted above, it should be understood that the current disclosure is not limited to any particular range of dimensions. Accordingly, notches and jets having dimensions both larger and smaller than those noted above are contemplated as the disclosure is not limited in this fashion.

As described above, the articles and methods described herein may include an ablation layer. In some embodiments, the ablation layer is disposed between a confinement layer and a first component. The term "ablation layer" may refer to a layer that may be vaporized (e.g., formed into a plasma). In some embodiments, a laser or other light source is used to heat the ablation layer which is configured to at least partially absorb energy from the incident laser or other light source. The ablation layer may comprise a variety of materials that at least partially absorb energy in wavelength ranges corresponding to the associated light source. Examples of ablation layer materials may include, but are not limited to, carbon ink, carbon paste (e.g., carbon nanotube paste), polymers, liquids, and/or dyes.

As also noted above, in some embodiments, a confinement layer is disposed adjacent to an ablation layer, and the thickness, rigidity, and strength of the confinement layer is configured to confine an ablation layer and/or a shockwave generated by the ablation layer between the confinement layer and an associated first component. Accordingly, the now confined and expanding plasma may generate a shockwave in the associated first component such that a jet formed is formed on an opposing side of the first component. To facilitate this process, the confinement layer, in some embodiments, is at least partially transparent to a wavelength of light emitted by an associated light source (e.g., a laser) such that the light source is transmitted through the confinement layer to the underlying ablation layer. The confinement layer may be at least partially transparent (e.g., essentially transparent) to the light source. In some embodiments, the confinement layer is at least 50% transparent, at least 60% transparent, at least 70% transparent, at least 80% transparent, at least 90% transparent, at least 90% transparent, at least 95% transparent, at least 99% transparent, or at least 99.99% transparent to a wavelength of light emitted by e associated light source. Correspondingly, in some embodiments, the confinement layer is no greater than 99.99% transparent, no greater than 99% transparent, no greater than 95% transparent, no greater than 90% transparent, no greater than 80% transparent, no greater than 70% transparent, no greater than 60% transparent, or no greater than 50% transparent to a wavelength of light emitted by the associated light source. Combinations of the above-referenced ranges are also possible (e.g., at least 60% transparent and no greater than 99.99% transparent). Other ranges are possible.

Furthermore, the confinement layer may comprise a variety of materials. Non-limiting examples of confinement layer materials may include, but are not limited to a tape, liquids (e.g., water), a gel, and ceramics. Other materials are possible as the disclosure is not limited in such a fashion.

In some embodiments, joining materials together according to the methods described herein may be a cold process. As used herein, a "cold process" is method or process that occurs at a temperature below a melting temperature, glass transition temperature, or other phase transformation temperature of either one or both of the components to be joined together a first component, a second component) or materials of the first component and/or the second component. For example, during a joining process, a temperature of either one or both materials may be no greater than a glass transition temperature and/or a melting temperature of the first component and/or the second component during joining. In such an embodiment, providing such a temperature may reduce or prevent melting or creating undesired porosity in the first and/or second component (e.g., a polymer material of the first and/or second component).

In some embodiments, a temperature of the joining method (e.g., for generating a shockwave, during an ablation heating step, during penetrating the second component) is less than or equal to 200° C., less than or equal to 150° C., less than or equal to 100° C., less than or equal to 80° C., less than or equal to 60° C., less than or equal to 40° C., or less than or equal to 20° C. Correspondingly, the temperature of the joining method can be greater than or equal to 20° C., greater than or equal to 40° C., greater than or equal to 60° C., great than or equal to 80° C., greater than or equal to 100° C., greater than or equal to 150° C., or greater than or equal to 200° C. Combinations of the above-referenced ranges are also possible (e.g., greater than or equal to 20° C. and less than or equal to 40° C.). As described above, providing a temperature within the above-described ranges can allow joining of two materials to happen as a "cold process" relative to certain existing methods of joining. In some cases, the temperature of the joining method may be less than a glass transition temperature and/or a melting temperature of the first component (e.g., a material of the first component) and/or the second component (e.g., a material of the second component). In some embodiments, the temperature of the joining method is less than or equal to a first melting temperature of the first component and a second melting temperature of the second component. Providing temperatures at or below the melting temperature of the first and/or second component may advantageously allow for joining of the components without melting or damaging the components.

Articles and methods described herein may have several applications. For example, as technology advances toward miniaturized highly-functional devices, there is a desire for material joining with micron precision. Joining dissimilar materials, such as metals and plastics, enables the fabrication of composite materials with enhanced performance. In the field of microelectronics, such joints are desired for MEMS (microelectromechanical systems) fabrication, micro-components and connectors, miniature robots and miniature sensors, battery assembly, etc. Biomedical applications, particularly biomedical implants (e.g., tooth replacement), may also benefit from the micron precision afforded by the articles and method described herein, since current existing articles and methods may comprise bio-incompatible materials (e.g., solder), and hence micron-sized, bio-compatible joints may be made possible with the disclosed methods and articles. Additionally, the methods described herein are applicable to a wide range of materials. Further, do the known ability of high velocity jets to penetrate materials, it is envisioned that the disclosed jet-based connection methods described herein will enable material joining through jet locking of a wide variety of materials.

In contrast to certain existing methods of joining materials together, the articles and methods described herein advantageously may not require a filler material, such a solder, when joining materials (e.g., joining two materials) together.

Turning to the figures, specific non-limiting embodiments are described in further detail. It should be understood that the various articles, systems, components, features, and methods described relative to these embodiments may be used either individually and/or in any desired combination as the disclosure is not limited to only the specific embodiments described herein.

As mentioned above, some embodiments describe a joining method (e.g., a process for joining materials together). The joining method and articles may allow for two materials to be joined together using a jet locking based technique. Further, the disclosed methods and articles may permit micron-sized materials to be joined together. In either case, the two materials may be arranged next to each other, and joining of the materials (e.g., a metal to a polymer) may be accomplished by forming a jet (e.g., a micro-jet) directed from a surface of the first component towards the second component such that the second component is penetrated by the jet and held in place relative to the first component by the jet.

Figure 1B:
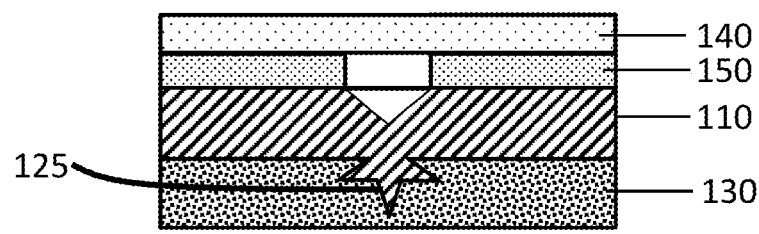

FIGS. 1A-1B illustrate one embodiment of two components being joined together using a jet-based connection method. In the figures, a surface of a first component 110 is disposed adjacent to a second component 130. An ablation layer 150 is disposed on a second surface of the first component opposite the second component and a confinement layer 140 may be disposed on the ablation layer such that the ablation layer is disposed between the first component and the confinement layer. Additionally, the first component 110 may include a notch 120 formed in the surface of the first component adjacent to the second component where the notch is directed towards the second component 130. Specifically, the illustrated notch is a "V"-shaped notch with the open portion of the "V" oriented towards the second component. However, other notch geometries may also be used including, but not limited to, round or conical indentations, trenches, and/or any other geometry capable of focusing the shockwave in a manner to form a jet of material toward the second component. Regardless of the specific shape, the notch may be configured to assist in forming a jet directed from the first component into the second component as detailed below. Accordingly, the notch may be positioned where the jet will be formed during the connection process detailed below.

After positioning the components relative to one another, a laser 160*a*, or other light energy, may be directed onto the ablation layer to create a shockwave that forms the jet by heating the ablation layer to form a plasma. For example, the ablation layer 150 may be heated by energy emitted by the light source and directed towards the first component by a light source 160 (e.g., a laser). The laser is incident on an exterior surface of the confinement layer 140 disposed on a side of the ablation layer opposite the first component. The laser, or other light energy, passes through the confinement layer to the ablation layer since the confinement layer is at least partially transparent to the light energy. The ablation layer then absorbs at least a portion of the incident light energy causing the ablation layer to heat up and turn into a plasma. However, the confinement layer exhibits sufficient resistance to expansion of the plasma, on the time scale of heating, such that the confinement layer confines the ablation layer and generates a shockwave that propagates through the first component towards the notch 120 and second component 130 located on an opposing side of the first component.

After generating the shockwave, the shockwave passes through the first component 110 until it encounters the notch 120. The notch may have an appropriate size and geometry such that the notch may focus the incident portion of the shockwave to form a jet 125 from the material of the first component 110 that is ejected outwards from a surface of the first component 110 towards the second component 130. The jet may then penetrate at least partially into, and be retained within, the second component 130 to form a connection between the two components as shown in FIG. 1B.

The following examples are intended to illustrate certain embodiments of the present disclosure, but do not exemplify the full scope of the disclosure.

Example 1

This example describes how laser-induced metallic micro-jets can be used as a micro-locking (or micro-riveting) mechanism to join materials (e.g., a metal to a plastic), in a cold process.

Figure 2:
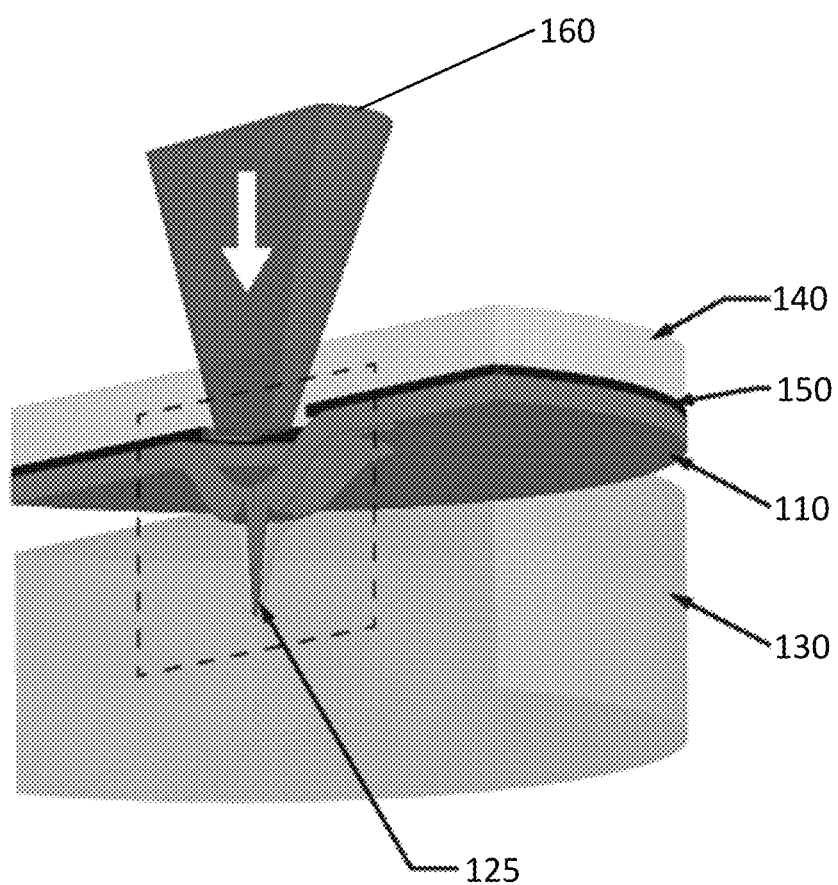
FIG. 2 schematically illustrates laser excitation to form a jet from a notch where the jet extends from a first component into a second component, according to some embodiments.
Figure 3A:
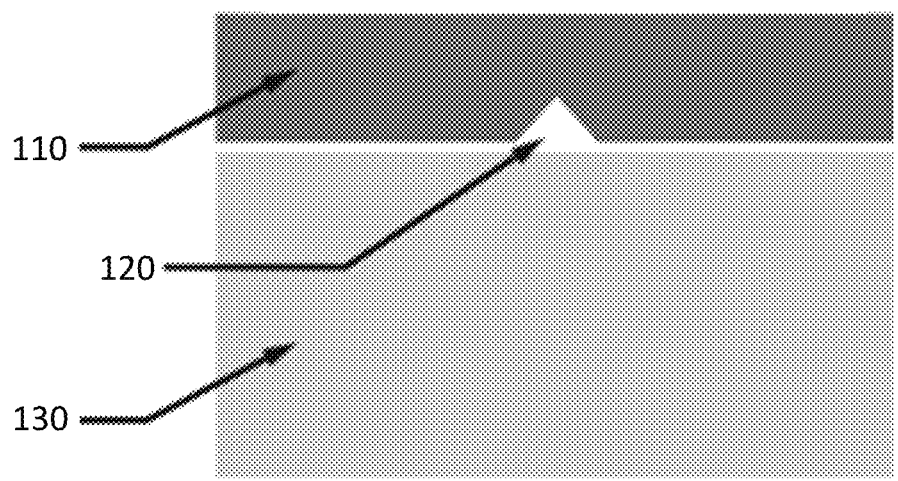
FIGS. 3A-3B schematically illustrate a first component and a second component before and after joining, according to some embodiments.
Figure 3B:
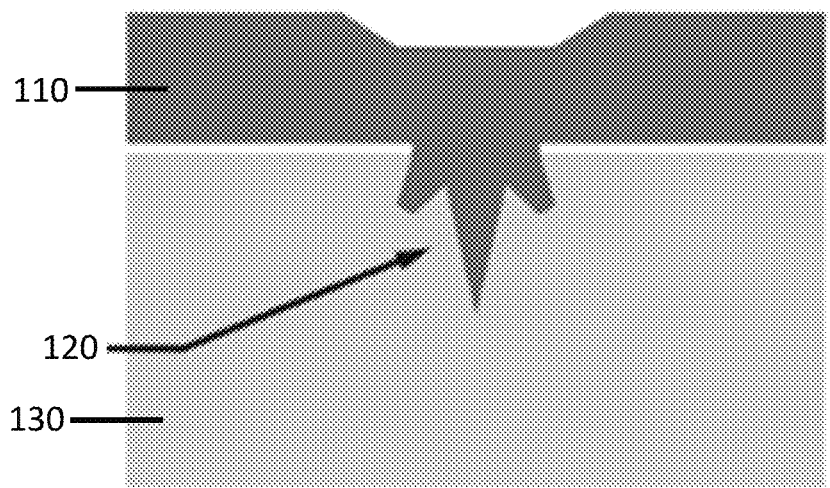

The joining method described herein may advantageously enable the formation of dissimilar materials joints with high repeatability, low heat input, and low production time. A laser pulse (e.g., a nanosecond-duration Nd:NAG pulse) is used to generate a shockwave in a metallic foil via an ablation process. The laser pulse ablates a sacrificial ablation layer that is sandwiched between an optically-transparent confinement layer (e.g., a liquid layer or a glass substrate) and a metallic foil. Prior to laser ablation, the metallic foil is carved with a micro-notch (either in a conical, or round shape or as a trench) Where the joint is desired. When the shock generated upon laser ablation (e.g., at the top of the foil) reaches the notch, a jet forms and material is ejected at high velocity, as schematically illustrated in FIGS. 2-3B.

Figure 4:
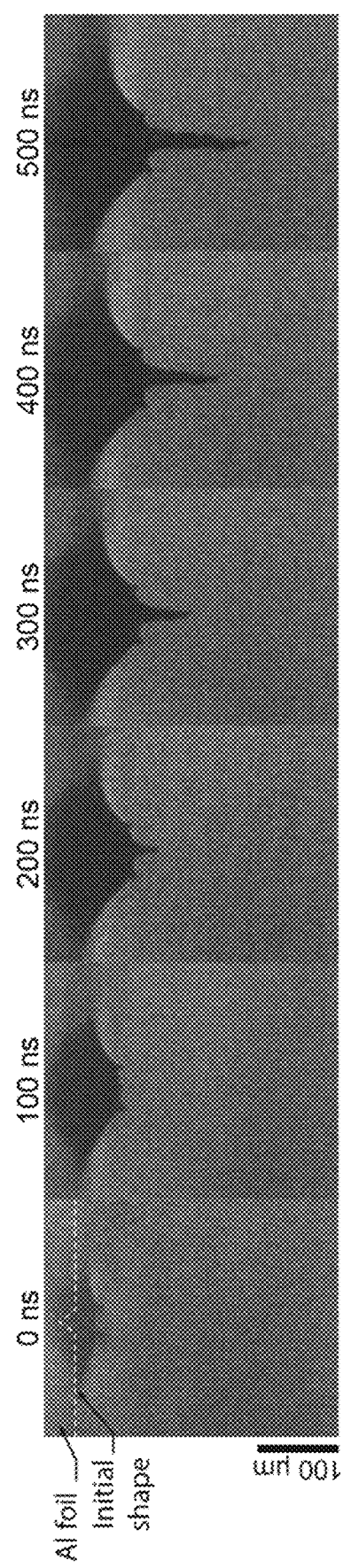
FIG. 4 shows time-lapsed micron scale photographic images of aluminum foil jetting in air following laser ablation, where the initial (before laser excitation) notch shape is shown in the first frame and the image sequence was taken using an ultra-high-speed camera with 5 ns exposure time and 150 ns inter-frame time, according to some embodiments.

FIG. 4 shows the experimental evidence of jet formation following laser ablation. In this example, the jet traveled at about 400 m/s in air. These images were captured using high-speed imaging. The initial (before laser excitation) notch shape is shown in the first frame. Note the micron scale. This image sequence was taken using an ultra-high-speed camera with 5 ns exposure time and 150 ns interframe time.

Example 2

Figure 5:
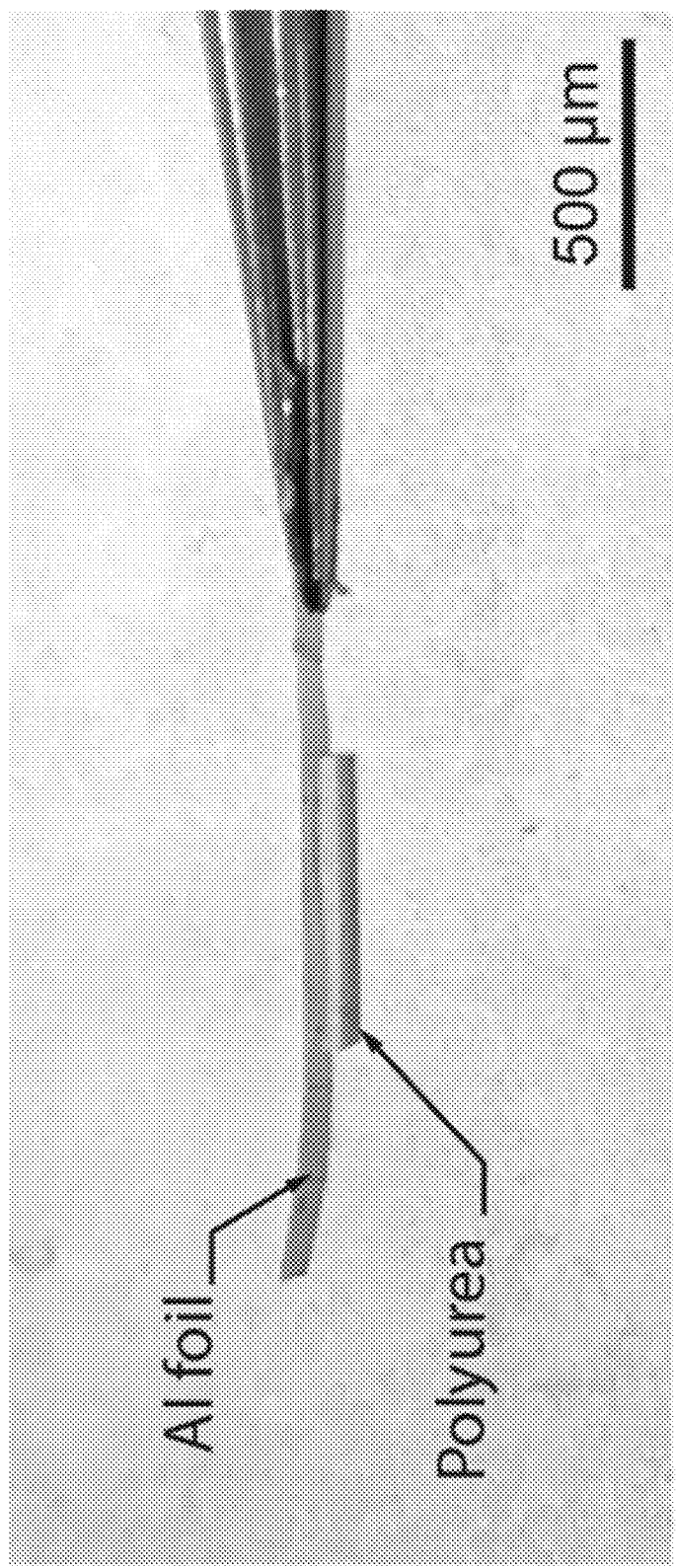
FIG. 5 is an image of aluminum foil joined to a polyurea elastomer with a single joint, according to one embodiment.

As illustrated in the photographic image, FIG. 5 shows an aluminum foil (50-μm thickness) joined to a polyurea specimen using the methods described elsewhere herein.

Example 3

The following example describes advantages and improvements over existing methods. Specifically, existing methods for joining techniques of metal and plastic materials include mechanical fastening, adhesive bonding, ultrasonic and laser welding, and laser brazing. Table 1 below, provides a comparison of the currently disclosed methods and these existing joining techniques.

TABLE 1

Comparison of present technique with existing techniques

|  | mechanical fastening | adhesive bonding | ultrasonic welding | laser welding | laser brazing | present method |
|---|---|---|---|---|---|---|
| Cold process | yes | yes | Yes | no | no | yes |
| Micron scale | no | no | Yes | yes | yes | yes |
| Interface material | yes (fastener) | yes (glue) | No | no | yes | no |
| External pressure | yes | no | Yes | no | no | no |
| Material limitation | no | no | Yes | yes | yes | no |
| Joining continuity | discont. | cont. | Both | discont. | discont. | discont. |

Operation at low temperatures (e.g., a cold process) is usually preferred as it limits thermal cycling on the joint, which can affect the physico-chemical properties of the materials and decrease joint performance (e.g., lower strength). Micro-scale precision may be desirable for a range of applications from microelectronics to medical implants, as described above.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed.

The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A joining method, the method comprising:
generating a shockwave against a first surface of a first component while a second surface of the first component opposite from the first surface is disposed against a second component; propagating the shockwave through the first component towards a notch formed in the second surface of the first component;
forming a jet of a material of the first component extending out from the second surface and directed towards the second component; and
penetrating the second component with the jet to join the first component with the second component.

2. The method of claim 1, wherein the shockwave is generated by a laser.

3. The method of claim 1, wherein generating the shockwave comprises heating an ablation layer disposed between the first component and a confinement layer.

4. The method of claim 3, further comprising forming a plasma in the ablation layer, and wherein the plasma generates the shockwave.

5. The method of claim 1, wherein penetrating the jet into the second component is complete within 500 nanoseconds.

6. The method of claim 1, wherein, while forming the jet:
a temperature of the first component and a temperature of the second component are less than a glass transition temperature and/or a melting temperature of the first component; and
the temperature of the first component and the temperature of the second component are less than a glass transition temperature and/or a melting temperature of the second component.

7. The method of claim 6, wherein, while forming the jet, the temperature of the first component and the temperature of the second component are less than a the melting temperature of the first component and a the melting temperature of the second component.

8. The method of claim 1, wherein the jet is a jet of solid material.

9. The method of claim 1, wherein the shockwave propagates with a velocity of greater than or equal to 100 m/s.

10. The method of claim 1, further comprising focusing the shockwave with the notch to form the jet.

11. A joining method, the method comprising:
generating a shockwave against a first surface of a first component, wherein the first component includes a second surface opposite from the first surface;
propagating the shockwave through the first component towards a notch formed in the second surface of the first component;
forming a jet of a material of the first component extending out from the second surface and directed towards a second component; and
penetrating the second component with the jet to join the first component with the second component.

12. The method of claim 11, further comprising focusing the shockwave with the notch to form the jet.

13. The method of claim 11, further comprising forming the jet at a location of the notch on the second surface.

14. The method of claim 11, wherein the shockwave is generated by a laser.

15. The method of claim 11, wherein generating the shockwave comprises heating an ablation layer disposed between the first component and a confinement layer.

16. The method of claim 15, further comprising forming a plasma in the ablation layer, and wherein the plasma generates the shockwave.

17. The method of claim 11, further comprising generating the shockwave while the second surface of the first component is disposed against the second component.

18. The method of claim 11, wherein, while forming the jet: each of a temperature of the first component and a temperature of the second component is less than a glass transition temperature and/or a melting temperature of the first component; and
each of the temperature of the first component and the temperature of the second component is less than a glass transition temperature and/or a melting temperature of the second component.

19. The method of claim 18, wherein, while forming the jet, each of the temperature of the first component and the temperature of the second component is less than the melting temperature of the first component and the melting temperature of the second component.

20. A joining method, the method comprising:
providing a first component comprising a material and having a first surface and a second surface opposite the first surface;
providing a second component having a third surface, wherein the third surface of the second component is in contact with the second surface of the first component;
generating a shockwave in the first component in a direction from the first surface towards the second surface while the second surface is in contact with the third surface; propagating the shockwave through the first component towards a notch formed in the second surface of the first component;
forming, by the generated shockwave, a jet of the material of the first component extending out from the second surface directed towards the second component;
penetrating the third surface of the second component with the jet of the material; and
joining the first component with the second component with the penetrating jet of the material.

21. The method of claim 20, wherein the shockwave is generated by a laser.

22. The method of claim 20, wherein generating the shockwave comprises heating an ablation layer disposed between the first component and a confinement layer.

23. The method of claim 22, further comprising forming a plasma in the ablation layer, and wherein the plasma generates the shockwave.

24. The method of claim 20, wherein, while forming the jet:
each of a temperature of the first component and a temperature of the second component is less than a glass transition temperature and/or a melting temperature of the first component; and
each of the temperature of the first component and the temperature of the second component is less than a glass transition temperature and/or a melting temperature of the second component.

* * * * *